Feb. 15, 1927.

E. SCHNEDAREK 1,618,131

BUILDING DRUM FOR THE MANUFACTURE OF TIRE BEADS

Filed Feb. 1, 1926

INVENTOR.
EMIL SCHNEDAREK
BY
ATTORNEY.

Patented Feb. 15, 1927.

1,618,131

UNITED STATES PATENT OFFICE.

EMIL SCHNEDAREK, OF AKRON, OHIO, ASSIGNOR TO THE FALLS RUBBER COMPANY, OF CUYAHOGA FALLS, OHIO, A CORPORATION OF OHIO.

BUILDING DRUM FOR THE MANUFACTURE OF TIRE BEADS.

Application filed February 1, 1926. Serial No. 85,143.

This invention relates to the manufacture of pneumatic tires and particularly to the operations of building inextensible tire beads, the objects of the invention being to improve upon apparatus for this purpose with a view to obtaining more rapid and efficient production.

Beads for pneumatic tires of the inextensible bead or "straight side" type are made of a plurality of layers of wire or wire tape which form the reenforcement for the bead. This wire tape is usually run through a tubing machine by which it is given a thorough coating or insulation of rubber composition, and from the tubing machine the wire is wound up in reels and then to a forming ring or led directly to a form or ring to which it is attached. The ring is then rotated a sufficient number of times to wind a plurality of layers about its outer periphery.

Heretofore in the use of rings for the building up of the wire reenforcement, clips or fasteners have been used for attaching the leading end of the wire tape to the ring, requiring time and attention on the part of the operator. In the improved ring construction here shown, the attachment of the wire tape to the ring can be taken care of during the expansion of the ring and no additional operation is required.

The ring shown and described herein is contractible so that the completed ring of bead reenforcement can be removed easily and quickly and in the ring is provided a space in which the end of the tape can be inserted and clamped by the expansion of ring. The space is adjustable so that bead tapes of varying thicknesses may be used.

It will be understood that while the drawing and description are specific to a single embodiment of the invention, changes and modifications may be made therein within the scope of the invention as set forth in the claims.

Figure 1:
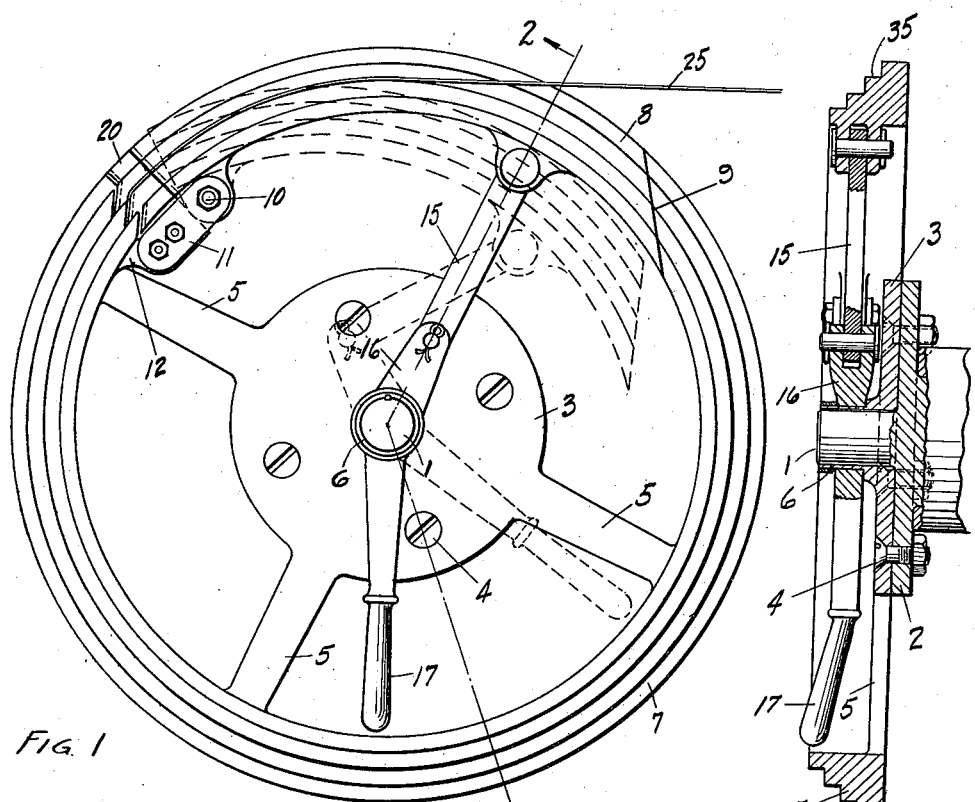
Figure 1 is a side elevation of a complete bead ring shown in expanded position in full lines and contracted position in dotted lines.
Figure 2:
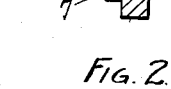
Figure 2 is a cross-section on the line 2—2 of Figure 1.
Figure 3:
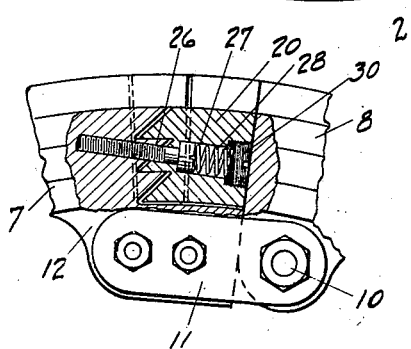
Figure 3 is a fragmentary section through the locking block.

The bead ring of the present invention is carried upon a driven shaft 1 on the outer end of which is formed a flange 2. Over the outer end of the shaft is passed a supporting plate 3 which is secured to the flange by bolts 4. The plate is provided with three radial arms 5 and with a central hub 6. Integrally formed with the arms is the main portion or sector of the bead forming ring 7.

A movable ring sector 8, divided from the main ring at one side by an oblique cut 9, is pivoted to the ring at the other side by means of a pin 10 carried in links 11 which are secured to a lug 12 on the opposite end of the ring.

The sector 8 is moved above the pivot 10 to contract the ring by a link 15 pivoted at its outer end to the sector 8 and at its inner end to an arm 16 which is rotated upon the hub 6. An operating lever 17 projects from the arm by which the ring may be contracted to the dotted line position of Figure 1.

Between the pivoted end of the sector 8 and the adjacent end of the sector 7 is located a sliding grip block 20. The mating faces of the block 20 and the ring 8 are substantially radial, while the mating faces of the block 20 and the ring 7 are at an oblique angle to the radius of the ring, these faces forming jaws for clamping the end of the wire tape 25 and being preferably corrugated or roughened to afford a better grip thereon.

The block 20 is slidably mounted upon the end of a bolt 26, the head of which is received within a recess 27. A coil spring 28 is housed within the recess and bears at its outer end against a screw threaded and adjustable plug 30, which is shown flush with the mating faces of the block and the sector 8. By screwing the plug outwardly, the space or gap between the jaws may be varied to accommodate different thicknesses of wire tape.

The surface of the complete bead ring, including both sectors 7 and 8 and the block 20, is provided with a plurality of ledges or steps 35 so that different diameters of beads may be manufactured upon the same ring.

The operation and advantages of the device will be apparent to those skilled in the art. When the ring is contracted, as shown in dotted line position in Figure 1, the operator places the leading end of the wire tape in the jaws between the sliding block 20 and the fixed sector 7. The closing action of the ring grips the end of the tape and it is securely held in position. The gripping of the tape being merely an incident to the closing of the ring, no further attention is required upon the part of the operator, and no extra clips or other fastening means is required.

The invention is not limited to the exact construction as shown and described, nor is it limited to the manufacture of beads although designed for that purpose.

What is claimed is:

1. A ring for the building of tire beads, comprising a fixed sector and a movable sector, jaws on said ring operated by the movement of the latter sector to grip the bead material.

2. A ring for the building of tire beads, comprising a sector, means to move the sector to contract the ring, and jaws on said ring operated by the movement of said sector to grip the bead material.

3. A ring for the building of tire beads, comprising a fixed sector and a pivoted sector, means to move the pivoted sector to circular alignment with the fixed sector, and jaws on the ring operated by the expanding movement of the pivoted sector to grip the bead material.

4. A ring for the building of tire beads, comprising a fixed sector and a pivoted sector hinged thereto, and jaws at the hinge operating to grip the bead material when the pivoted sector is moved outwardly.

5. A ring for the building of tire beads, comprising a fixed sector and a movable sector, jaws at the mating faces of said sectors operable to grip the bead material upon movement of the latter sector in alignment with the former sector.

6. A ring for the building of tire beads, comprising a fixed sector and a pivoted sector hinged together, mechanism to move the pivoted sector outwardly to complete the ring, and a movable jaw cooperating with the end of the fixed sector to grip the bead material and movable by the outward movement of the pivoted sector.

7. A ring for the building of tire beads, comprising a fixed sector and a movable sector, mechanism to move the latter sector outwardly to complete the ring, and a movable jaw cooperating with the end of the fixed sector to grip the bead material.

8. A ring for receiving convolute windings of material, said ring comprising sectors which form a complete ring, means for contracting and expanding the ring, and gripping jaws for the material to be wound upon the ring operable to clamp the material upon the expansion of the ring.

9. A ring for making beads, comprising a fixed sector, a pivoted sector at the end of the fixed sector, a sliding block attached to the fixed sector at the hinge, the meeting edge of the block and the fixed sector forming jaws, and a spring for urging the fixed sector and the block apart.

10. A ring for making beads, comprising a fixed sector, a pivoted sector at the end of the fixed sector, a sliding block attached to the fixed sector at the hinge, the meeting edge of the block and the fixed sector forming jaws, a spring for urging the fixed sector and the block apart, and an adjusting device for varying the distance between the jaws.

EMIL SCHNEDAREK.